(12) United States Patent
Chen

(10) Patent No.: US 7,784,154 B2
(45) Date of Patent: Aug. 31, 2010

(54) VARIABLE FRICTION HINGE

(75) Inventor: Po-Chuan Chen, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 444 days.

(21) Appl. No.: 11/987,927

(22) Filed: Dec. 6, 2007

(65) Prior Publication Data

US 2009/0144933 A1 Jun. 11, 2009

(51) Int. Cl.
*E05C 17/64* (2006.01)
(52) U.S. Cl. ............................... 16/342; 16/312; 16/337
(58) Field of Classification Search ................... 16/319, 16/337, 338, 339, 340, 341, 342, 343, 344, 16/345, 347, 352, 353, 374, 376, 312; 455/575.3; 379/433.11, 433.12, 433.13; 361/679.06, 361/679.07, 679.11, 679.12, 679.15, 679.16, 361/679.2, 679.27, 679.28
See application file for complete search history.

(56) References Cited

U.S. PATENT DOCUMENTS

| | | | | |
|---|---|---|---|---|
| 7,222,396 B2* | 5/2007 | Lu et al. | | 16/340 |
| 7,520,027 B2* | 4/2009 | Lu et al. | | 16/340 |
| 7,536,749 B2* | 5/2009 | Lu et al. | | 16/330 |
| 7,565,719 B2* | 7/2009 | Su | | 16/337 |
| 2005/0278895 A1* | 12/2005 | Su | | 16/340 |
| 2006/0200945 A1* | 9/2006 | Lu et al. | | 16/340 |
| 2007/0151080 A1* | 7/2007 | Lu et al. | | 16/340 |
| 2007/0174996 A1* | 8/2007 | Lu et al. | | 16/340 |
| 2007/0180656 A1* | 8/2007 | Chen et al. | | 16/340 |
| 2007/0261204 A1* | 11/2007 | Lu et al. | | 16/340 |
| 2007/0261205 A1* | 11/2007 | Lu et al. | | 16/340 |

* cited by examiner

*Primary Examiner*—Victor Batson
*Assistant Examiner*—Jeffrey O'Brien
(74) *Attorney, Agent, or Firm*—Posz Law Group, PLC

(57) ABSTRACT

A variable friction hinge is mounted between a cover and a base of an electronic device and has a pintle, a stationary leaf and a washer assembly. The pintle is connected to the cover. The stationary leaf is connected to the base and has an activating panel with an activating edge. The washer assembly has a movable washer, an abrasion washer and a biasing member. The movable washer selectively abuts the activating edge of the activating panel and has an elongated hole slidably mounted securely around the pintle. The movable and the abrasion washers have teeth corresponding to and selectively engaging each other, causing less friction when engaged and more friction when disengaged. When rotated the movable washer selectively disengages the teeth causing the hinge to have greater friction when being rotated one way than the other.

10 Claims, 5 Drawing Sheets

VARIABLE FRICTION HINGE

BACKGROUND OF THE INVENTION

1. Field of the Invention

The present invention relates to a hinge, especially to a variable friction hinge being mounted between a cover and a base of an electronic device to provide different friction when the cover is opened or closed.

2. Description of the Prior Arts

Electronic devices such as notebook computers, cell phones and the like have a cover with a display and a base. To allow the cover to be pivoted relative to the base, a hinge is mounted between the cover and the base. The hinge provides friction when the cover is pivoted to the base to maintain the cover at any desired angle. When the cover is closed relative to the base, the hinge needs to offer more resistance to prevent the cover from gaining momentum and bumping into the base, thereby causing damage. When the cover is opened relative to the base, the hinge needs to offer less resistance to allow the cover to be opened quickly and easily and give access to the electronic device faster. However, the conventional hinge provides the same friction during opening and closing. Therefore a balance is struck between low resistance and easy to open but not preventing damage and high resistance, preventing damage but hard to open.

To overcome the shortcomings, the present invention provides a hinge with variable friction to mitigate or obviate the aforementioned problems.

SUMMARY OF THE INVENTION

The main objective of the present invention is to provide a variable friction hinge to allow a cover of an electronic device to have different opening and closing resistances. The hinge with variable friction is mounted between the cover and the base of the electronic device and has a pintle, a stationary leaf and a washer assembly. The pintle is connected to the cover. The stationary leaf is connected to the base and has an activating panel with an activating edge. The washer assembly has a movable washer, an abrasion washer and a biasing member. The movable washer selectively abuts the activating edge of the activating panel and has an elongated hole slidably mounted securely around the pintle. The movable and the abrasion washers have teeth corresponding to and selectively engaging each other, causing less friction when engaged and more friction when disengaged. When rotated the movable washer selectively disengages the teeth causing the hinge to have greater friction when being rotated one way than the other.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
FIG. 1 is a perspective view of a variable friction hinge in accordance with the present invention.

With reference to FIG. 1, a variable friction hinge in accordance with the present invention comprises a pintle (10), an optional rotating leaf (20), a stationary leaf (30) and a washer assembly (40).

Figure 2:
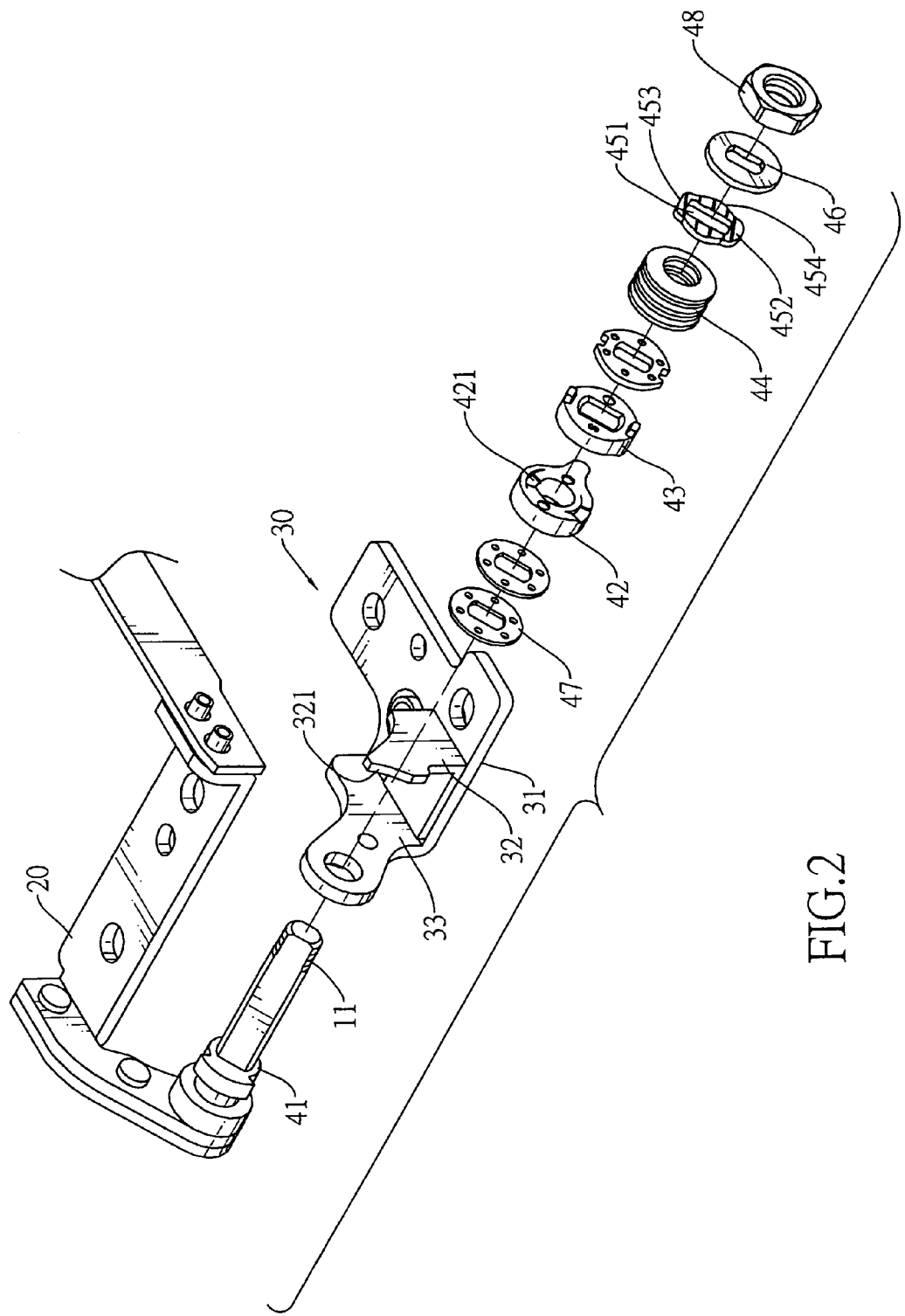
FIG. 2 is an exploded perspective view of the hinge in FIG. 1.

With further reference to FIG. 2, the pintle (10) is non-circular in cross section and has a proximal end, a distal end and an optional threaded segment (11). The threaded segment (11) is formed around the distal end of the pintle (10).

The rotating leaf (20) is attached securely to the proximal end of the pintle (10).

Figure 3:
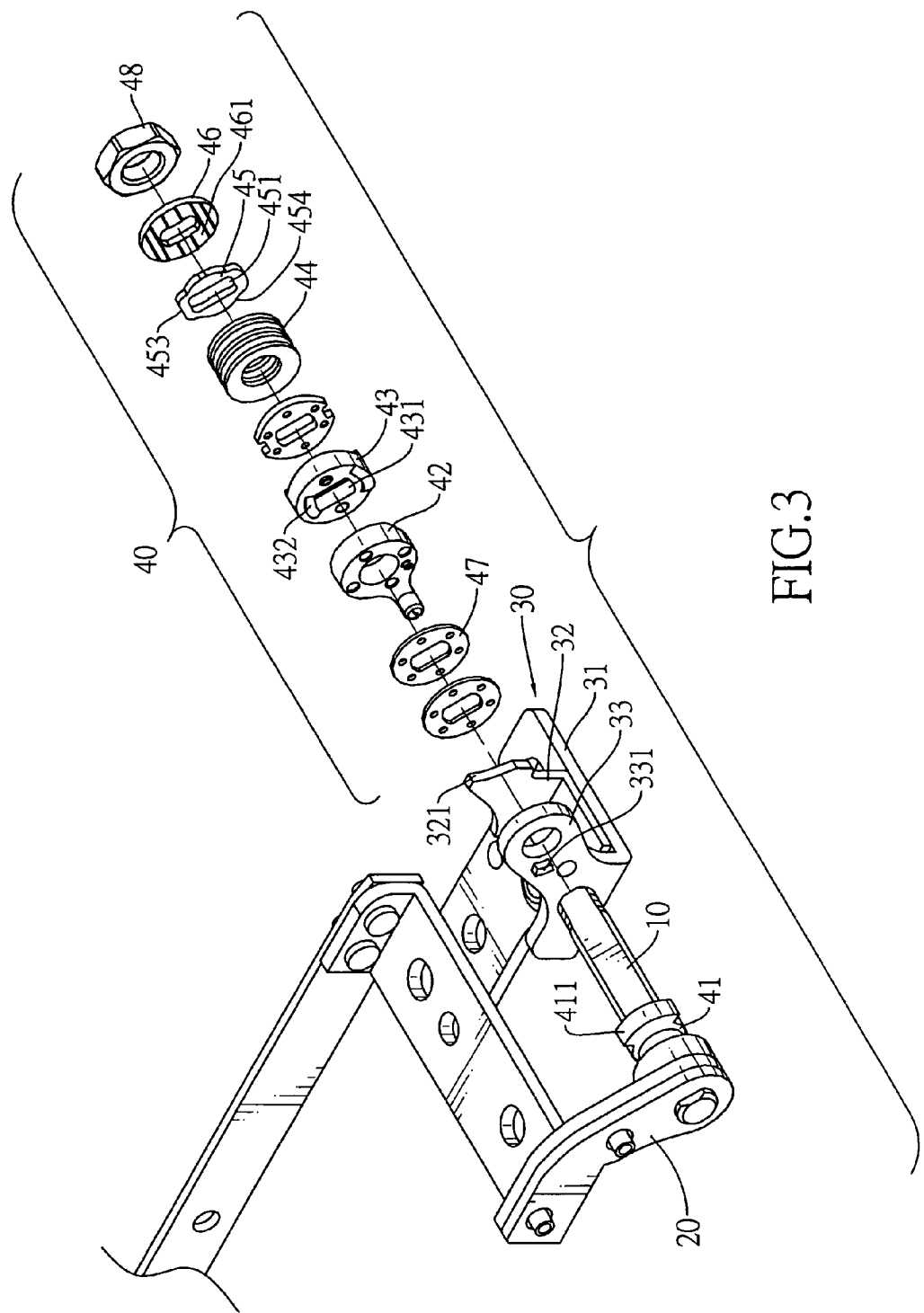
FIG. 3 is another exploded perspective view of the hinge in FIG. 1.

With further reference to FIG. 3, the stationary leaf (30) is connected to the pintle (10) and has a main panel (31), an activating panel (32) and a mounting panel (33). The activating panel (32) is formed perpendicularly on the main panel (31) and has an activating edge (321) and an outer surface. The mounting panel (33) is formed perpendicularly on the main panel (31) near the outer surface of the activating panel (32), is mounted rotatably around the pintle (10) and has an inner surface, an outer surface and an optional stop (331). The stop (331) is formed on and protrudes out from the outer surface of the mounting panel (33).

The washer assembly (40) is mounted around the pintle (10) and has an optional limiting washer (41), an optional stationary positioning washer (42), an optional rotating positioning washer (43), a movable washer (45), an abrasion washer (46), a biasing member (44), multiple optional rubbing washers (47) and a fastener (48).

The limiting washer (41) is mounted securely on the pintle (10) adjacent to the outer surface of the mounting panel (33) and has an annular edge and a limit (411). The limit (411) is formed on and protrudes transversely out from the annular edge of the limiting washer (41) and corresponds to and selectively abuts the stop (331) on the mounting panel (33) to limit the rotating angle of the pintle (10).

The stationary positioning washer (42) is mounted around the pintle (10), is connected securely to the mounting panel (33) adjacent to the inner surface of the mounting panel (33) and has an inner surface and at least one positioning detent (421). The positioning detent (421) is formed in the inner surface of the stationary positioning washer (42).

The rotating positioning washer (43) is mounted securely on the pintle (10) and has an inner surface, an outer surface and at least one positioning protrusion (431). The positioning protrusion (431) is formed on and protrudes from the outer surface of the rotating positioning washer (43) and corresponds to and selectively engages the positioning detent (421) of the stationary positioning washer (42) to provide preferred preset positions.

The biasing member (44) is mounted around the pintle (10) to provide a resistive force.

The movable washer (45) is mounted movably around and is rotated by the pintle (10), is adjacent to the biasing member (44) and has an inner surface, an outer surface, an annular edge, a center, an elongated hole (451), multiple teeth (452), two displacement protrusions (453) and two replacement protrusions (454).

The elongated hole (451) is formed through the movable washer (45), corresponds to and is slidably mounted securely around the pintle (10) to allow the movable washer (45) to slightly move relative to the pintle (10).

The teeth (452) are formed on the inner surface of the movable washer (45).

The displacement and replacement protrusions (453, 454) are formed separately on and protrude transversely out from the annular edge of the movable washer (45), selectively abut the activating edge (321) of the activating panel (32) and all have an end. The displacement protrusions (453) are opposite to each other. The replacement protrusions (454) are opposite to each other. A distance between the end of a replacement protrusion (454) and the center of the movable washer (45) is shorter than a distance between the end of a displacement protrusion (453) and the center of the movable washer (45).

The abrasion washer (46) is mounted securely on the pintle (10) adjacent to the movable washer (45) and has an outer surface and multiple teeth (461). The teeth (461) are formed on the outer surface of the abrasion washer (46) and selectively engage the teeth (452) of the movable washer (45). When the replacement protrusions (454) abut the activating edge (321) of the activating panel (32), the teeth (452) of the movable washer (45) engage the teeth (461) of the abrasion washer (46).

The rubbing washers (47) are mounted around the pintle (10) to reduce friction.

The fastener (48) is mounted securely on the distal end of the pintle (10) and may be a nut screwed onto the threaded segment (11) of the pintle (10).

The hinge as described is mounted between a cover and a base of an electronic device. The pintle (10) or the rotating leaf (20) is connected to the cover. The stationary leaf (30) is connected to the base. When the cover is pivoted relative to the base, the pintle (10) is rotated relative to the stationary leaf (30). Because the movable washer (45) and the abrasion washer (46) are rotated by the pintle (10), the movable washer (45) is rotated relative to the activating panel (32).

Figure 4:
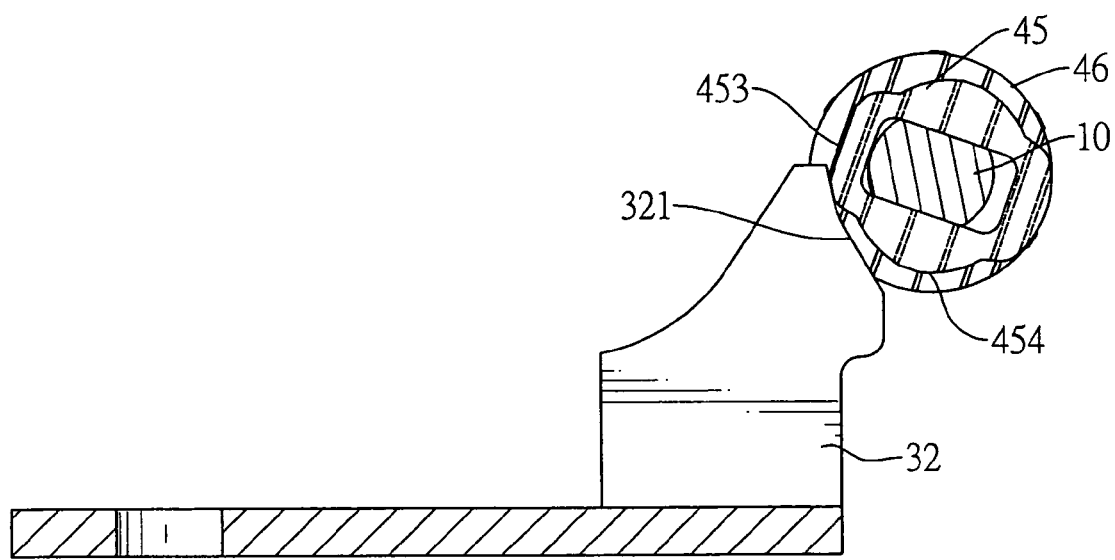
FIG. 4 is an operational end view in partial section of the hinge in FIG. 1 when closed.

With further reference to FIG. 4, the displacement protrusion (453) of the movable washer (45) abuts the activating edge (321) of the activating panel (32). The activating edge (321) pushes the movable washer (45) to move transversely along the pintle (10). Then the teeth (452) of the movable washer (45) disengage the teeth (461) of the abrasion washer (46). Therefore, a distance between the movable and abrasion washers (45, 46) is increased to constrict the biasing member (44), causing the biasing member (44) to exert a larger resistive force and provide more friction by pressing the movable washer (45). Therefore, when the cover of the electronic device is closed, the hinge as described provides more friction.

Figure 5:
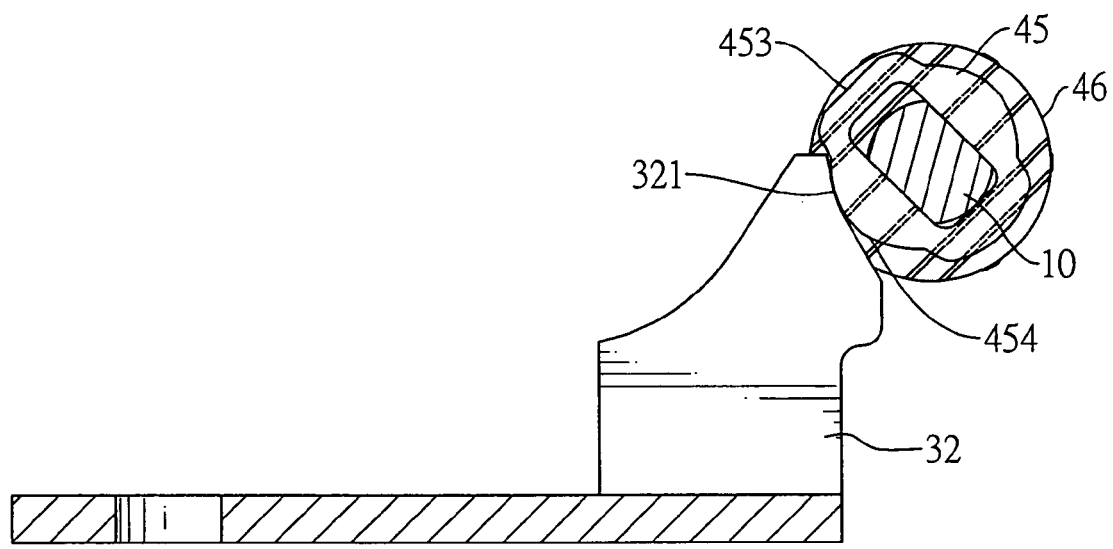
FIG. 5 is an operational end view in partial section of the hinge in FIG. 1 when opened.

With further reference to FIG. 5, when opening the hinge, the replacement protrusion (454) of the movable washer (45) abuts the activating edge (321) of the activating panel (32). Because the distance between the end of the displacement protrusion (453) and the center is larger than the distance between the end of the replacement protrusion (454) and the center, the movable washer (45) is moved due to the pressing of the biasing member (44). Then the teeth (452) of the movable washer (45) engage the teeth (461) of the abrasion washer (46). Therefore, the distance between the movable and abrasion washers (45, 46) is decreased to relax the biasing member (44) causing the biasing member (44) to exert less resistive force and provide less friction. Therefore, opening the cover of the electronic device encounters less resistance than closing the cover.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge with variable friction comprising:
    a pintle being non-circular in cross section having a proximal end and a distal end and defining a hinge axis;
    a stationary leaf being connected to the pintle and having
        a main panel;
        an activating panel being formed perpendicularly on the main panel and having an activating edge and an outer surface; and
        a mounting panel being formed perpendicularly on the main panel near the outer surface of the activating panel, being mounted rotatably around the pintle and having an inner surface and an outer surface; and
    a washer assembly being mounted around the pintle and having
        a biasing member being mounted around the pintle;
        a movable washer being mounted movably around and being rotated by the pintle adjacent to the biasing member and having
            an inner surface;
            an outer surface;
            an annular edge;
            a center;
            an elongated hole being formed through the movable washer, corresponding to and being slidably mounted securely around the pintle;
            multiple teeth being formed on the inner surface of the movable washer;
            two displacement protrusions being formed on and protruding transversely out from the annular edge of the movable washer, being opposite to each other, selectively abutting the activating edge of the activating panel and each displacement protrusion having an end being a distance from the center of the movable washer; and
            a replacement protrusion being formed on and protruding transversely out from the annular edge of the movable washer, being opposite to each other, selectively abutting the activating edge of the activating panel and each replacement protrusion having an end being a distance from the center of the movable washer shorter than the distance from the end of a displacement protrusion to the center;
        an abrasion washer being mounted securely on the pintle adjacent to the movable washer and having
            an outer surface; and
            multiple teeth being formed on the outer surface of the abrasion washer and selectively engaging the teeth of the movable washer; and
        a fastener mounted securely on the distal end of the pintle;
        whereby the movable washer moves perpendicular to the hinge axis along the elongated hole when the two displacement protrusions and the replacement protrusion selectively abut the activating edge during an opening and closing movement of the hinge so as to alternately align and misalign the teeth of the abrasion washer and the teeth of the movable washer to decrease opening friction and increase closing friction respectively.

2. The hinge as claimed in claim 1 further comprising a rotating leaf being attached securely to the proximal end of the pintle.

3. The hinge as claimed in claim 1, wherein
the mounting panel further has a stop being formed on and protruding out from the outer surface of the mounting panel; and
the washer assembly further has a limiting washer being mounted securely on the pintle adjacent to the outer surface of the mounting panel and having
an annular edge; and
a limit being formed on and protruding transversely out from the annular edge of the limiting washer and corresponding to and selectively abutting the stop on the mounting panel.

4. The hinge as claimed in claim 2, wherein
the mounting panel further has a stop being formed on and protruding out from the outer surface of the mounting panel; and
the washer assembly further has a limiting washer being mounted securely on the pintle adjacent to the outer surface of the mounting panel and having
an annular edge; and
a limit being formed on and protruding transversely out from the annular edge of the limiting washer and corresponding to and selectively abutting the stop on the mounting panel.

5. The hinge as claimed in claim 1, wherein the washer assembly further has
a stationary positioning washer being mounted around the pintle, being connected securely to the mounting panel adjacent to the inner surface of the mounting panel and having
an inner surface; and
at least one positioning detent being formed in the inner surface of the stationary positioning washer; and
a rotating positioning washer being mounted securely on the pintle and having
an inner surface;
an outer surface; and
at least one positioning protrusion being formed on and protruding from the outer surface of the rotating positioning washer and corresponding to and selectively engaging the positioning detent of the stationary positioning washer.

6. The hinge as claimed in claim 4, wherein the washer assembly further has
a stationary positioning washer being mounted around the pintle, being connected securely to the mounting panel adjacent to the inner surface of the mounting panel and having
an inner surface; and
at least one positioning detent being formed in the inner surface of the stationary positioning washer; and
a rotating positioning washer being mounted securely on the pintle and having
an inner surface;
an outer surface; and
at least one positioning protrusion being formed on and protruding from the outer surface of the rotating positioning washer and corresponding to and selectively engaging the positioning detent of the stationary positioning washer.

7. The hinge as claimed in claim 1, wherein the washer assembly further has multiple rubbing washers being mounted around the pintle.

8. The hinge as claimed in claim 6, wherein the washer assembly further has multiple rubbing washers being mounted around the pintle.

9. The hinge as claimed in claim 1, wherein
the pintle further has a threaded segment being formed around the distal end of the pintle; and
the fastener of the washer assembly is a nut being screwed onto the threaded segment of the pintle.

10. The hinge as claimed in claim 8, wherein
the pintle further has a threaded segment being formed around the distal end of the pintle; and
the fastener of the washer assembly is a nut being screwed onto the threaded segment of the pintle.

* * * * *